United States Patent
Iraschko et al.

(10) Patent No.: US 8,739,945 B2
(45) Date of Patent: Jun. 3, 2014

(54) DISC BRAKE ADJUSTING DEVICE HAVING AN OUTPUT SIDE COUPLING RING WITH A DEFINED WORKING ROTATIONAL ANGLE

(75) Inventors: Johann Iraschko, Schweitenkirchen (DE); Georg Kempinger, Eching (DE); Florian Orgler, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 220 days.

(21) Appl. No.: 13/015,974

(22) Filed: Jan. 28, 2011

(65) Prior Publication Data

US 2011/0203884 A1 Aug. 25, 2011

Related U.S. Application Data

(63) Continuation of application No. PCT/EP2009/005411, filed on Jul. 27, 2009.

(30) Foreign Application Priority Data

Jul. 30, 2008 (DE) .......................... 10 2008 035 366

(51) Int. Cl.
 *F16D 65/14* (2006.01)
(52) U.S. Cl.
 USPC ..................... 188/196 V; 188/71.7; 188/196 P
(58) Field of Classification Search
 USPC ............... 188/71.7, 71.8, 71.9, 196 R, 196 F, 188/196 P, 196 V, 214
 See application file for complete search history.

(56) References Cited

U.S. PATENT DOCUMENTS

| | | | | |
|---|---|---|---|---|
| 5,353,896 A | * | 10/1994 | Baumgartner et al. | 188/71.9 |
| 6,213,255 B1 | * | 4/2001 | Neuwirth | 188/71.9 |
| 7,331,432 B2 | * | 2/2008 | Watada | 188/72.7 |
| 7,484,602 B2 | * | 2/2009 | Iraschko et al. | 188/196 BA |
| 7,694,784 B2 | * | 4/2010 | Iraschko | 188/196 D |
| 7,926,626 B2 | * | 4/2011 | Iraschko | 188/72.7 |

(Continued)

FOREIGN PATENT DOCUMENTS

| | | |
|---|---|---|
| DE | 33 41 059 A1 | 5/1985 |
| DE | 36 21 712 A1 | 1/1988 |

(Continued)

OTHER PUBLICATIONS

English-language Abstract of DE 102 34 210 A1.*

(Continued)

*Primary Examiner* — Bradley King
*Assistant Examiner* — Nicholas J Lane
(74) *Attorney, Agent, or Firm* — Crowell & Moring LLP

(57) ABSTRACT

A wear adjustor adjusts the wear of brake pads and a brake disc of a pneumatic disc brake having a rotary lever brake application device. The wear adjustor is insertable into an adjusting spindle and attached to a caliper of the disc brake by a bearing disc. An axial bearing is formed axially on a side of a drive ring, and a ball ramp coupling with a freewheel function is formed axially on the opposite side of the drive ring. The ball ramp coupling includes balls and a drive socket which is arranged axially, on the drive side, between the axial bearing and the balls thereof, a cone coupling being arranged between the coupling ring on the output side and an elastic sleeve for a cylinder spring. The output-side coupling ring is designed for a working rotational angle defined by at least one fixed abutment.

6 Claims, 4 Drawing Sheets

(56) References Cited

U.S. PATENT DOCUMENTS

| | | |
|---|---|---|
| 2007/0209890 A1 | 9/2007 | Iraschko |
| 2009/0020378 A1* | 1/2009 | Watada et al. ............ 188/196 V |
| 2011/0155518 A1* | 6/2011 | Iraschko ...................... 188/71.8 |
| 2012/0132491 A1* | 5/2012 | Camilo-Martinez et al. . 188/196 F |

FOREIGN PATENT DOCUMENTS

| | | | |
|---|---|---|---|
| DE | 102 34 210 A1 * | 1/2004 | ................ F16B 2/16 |
| DE | 10 2004 037 7 A1 | 3/2006 | |
| DE | 10 2008 036 765 A1 * | 2/2010 | ............. F16D 65/52 |
| GB | 2 192 033 A | 12/1987 | |
| JP | 2007-085536 | 4/2007 | |
| JP | 2008-508490 | 3/2008 | |

OTHER PUBLICATIONS

English-language Abstract of DE 10 2008 036 765 A1.*
International Search Report including English language translation dated Feb. 24, 2010 (Four (4) pages).
German Office action including English translation dated Mar. 26, 2009 (Six (6) pages).

* cited by examiner

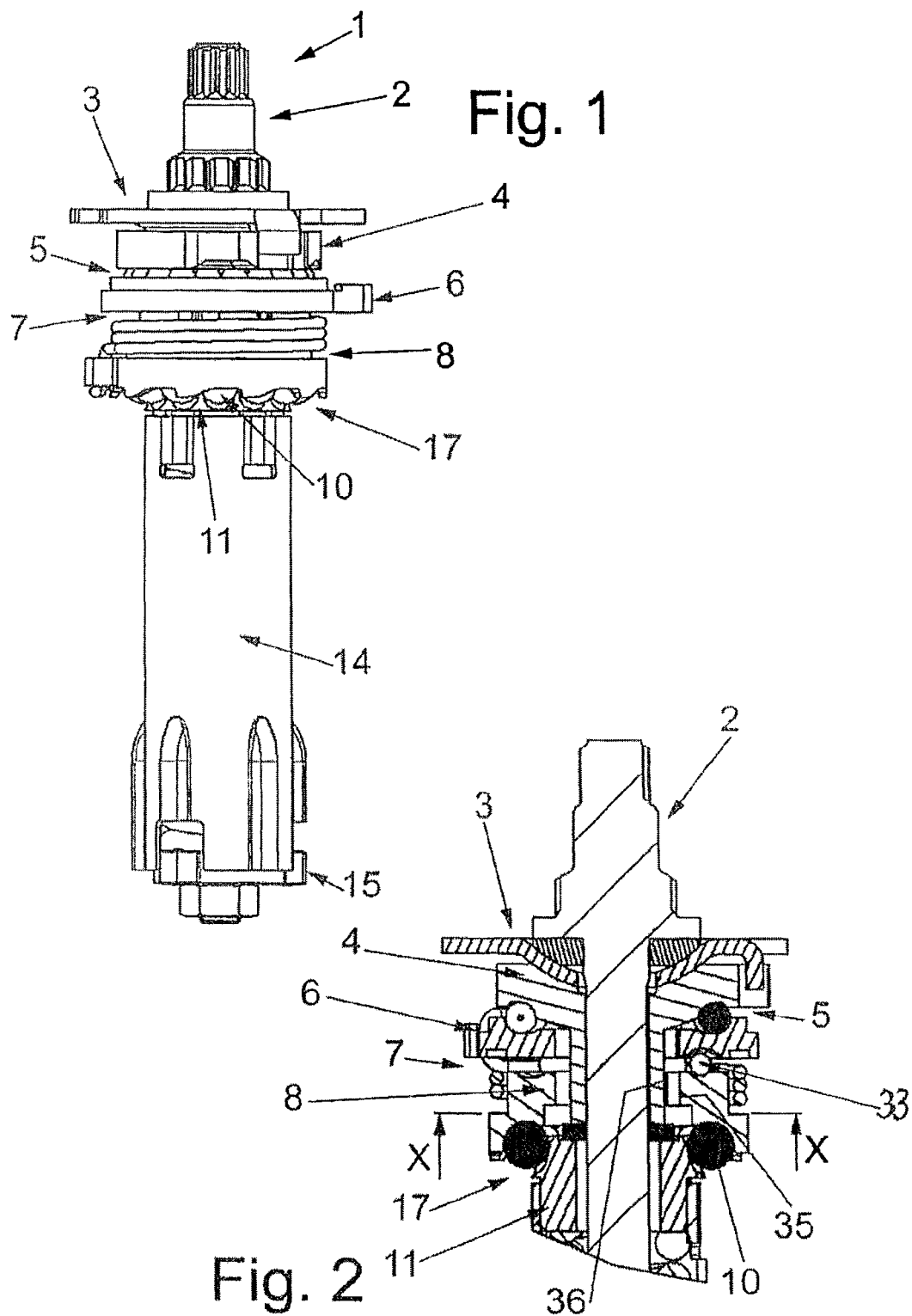

DISC BRAKE ADJUSTING DEVICE HAVING AN OUTPUT SIDE COUPLING RING WITH A DEFINED WORKING ROTATIONAL ANGLE

CROSS-REFERENCE TO RELATED APPLICATIONS

This application is a continuation of PCT International Application No. PCT/EP2009/005411, filed Jul. 27, 2009, which claims priority under 35 U.S.C. §119 from German Patent Application No. DE 10 2008 035 366.3, filed Jul. 30, 2008, the entire disclosures of which are herein expressly incorporated by reference.

This application contains subject matter related to U.S. application Ser. Nos. 13/015,954, 13/016,418, 13/016,078, and 13/015,930 entitled "A Disc Brake Adjusting Device Having a Cone Clutch Utilizing Clamping Balls," "Method for Fixing an Adjustment Device on a Disc Brake," "A Disc Brake Adjustment Device Having a Blocking Device," and "A Disc Brake Adjusting Device with a Torque Dependent Coupling" filed on even date herewith.

BACKGROUND AND SUMMARY OF THE INVENTION

The invention relates to an adjusting device for a disc brake and, in particular, an adjusting device for a pneumatically actuated disc brake. The adjusting device adjusts for wear of the brake pads and the brake disc of a pneumatically actuated disc brake having a rotary-lever-actuated brake application device, which adjusting device can preferably be inserted into an adjusting spindle of the disc brake and attached to a brake caliper of the disc brake by way of a bearing disc.

Adjusting devices or wear adjustors for disc brakes exist in various embodiments. DE 10 2004 037 771 A1 (having U.S. published counterpart application US2007/209890 A1) discloses an adjusting device for a disc brake, the specifications of which are expressly incorporated by reference herein. This adjusting device is suitable for a pneumatically actuated disc brake, in particular one of sliding-caliper design. Furthermore, the adjusting device can, however, also be used in pneumatically actuated fixed-caliper or pivoting-caliper disc brakes.

Pneumatically actuated disc brakes have over time become standard equipment on heavy commercial vehicles. Such disc brakes require mechanical boosting or "force amplification" in order to produce the demanded brake application force, because the force of the pneumatically charged brake cylinders is restricted on account of the pressure level (at present approximately 10 bar) and the limited structural size of the brake cylinder. Presently known pneumatically actuated disc brakes have boost ratios of between 10:1 and 20:1. The piston strokes of the brake cylinders are in the range from 50 mm to 75 mm, resulting in brake application travels of approximately 4 mm for pressing the brake pads against the brake disc.

The friction material thickness of the brake pads lies in the range of 20 mm, and because two pads are installed, this results in a wear travel of approximately 40 mm, not taking disc wear into consideration. This travel is a multiple greater than the abovementioned brake application travel. It is therefore necessary for the brake to be adjusted correspondingly to the pad wear by way of a device. The prior art provides automatic wear adjustment by way of which the so-called air play, that is to say the gap between the brake pads and the brake disc in the non-actuated state, is kept constant independently of the wear state and wear behavior of the brake pads.

In commercial vehicles, use is very often made of disc brakes which have an adjuster which is arranged concentrically in the cavity of a threaded spindle and which is driven eccentrically by a rotary brake lever via a drive element (for example switching finger or toothed wheel). During a braking process, the rotary lever which is coupled to the piston rod of the brake cylinder performs a rotational movement. Before the rotational movement of the lever is introduced into the adjuster via the coupling mechanism of the adjusting means (for example shift fork and shift finger or toothed wheel), a so-called idle travel must be overcome. This travel is decisive of the size of the so-called air play, because during the movement, the adjustment is not activated, and the brake application travel therefore constitutes the air play. After the idle travel is overcome, the adjuster is set in a rotational movement, and an adjusting process is initiated by the coupling to the threaded spindle or tube.

DE 10 2004 037 711 A1 describes an adjuster of the type, which is shown in FIG. 5. The adjuster is composed substantially of the following functional elements: shaft 2; bearing disc 3; axial bearing 5; collar bush, or spacer sleeve 19; shift fork, or drive ring 6; ball ramp clutch 7; cone clutch 17; and cylindrical spring 12. With regard to the description, reference is made to DE 10 2004 037 711 A1.

The adjusting device must basically perform two functions:
1. the automatic air play adjustment; and
2. the manual restoration or retraction of the adjusting mechanism upon replacing of the brake pads.

When being turned back, for example to replace the brake pads, the adjusting device is turned back or retracted by hand using a screwdriver from its so-called wear position into its initial position. Here, the adjusting device must be turned counter to the blocking direction of the freewheel. Since the freewheel however has a 100% blocking action, turning back cannot be carried out without special design measures.

It is therefore the object of the present invention to provide an adjusting device with improved manual restoration, with the above disadvantages being eliminated or significantly reduced, and further advantages being obtained.

This and other objects are achieved by an adjusting device for adjusting for wear of the brake pads and the brake disc of a pneumatically actuated disc brake having a rotary-lever-actuated brake application device, which adjusting device can preferably be inserted into an adjusting spindle of the disc brake and attached to a brake caliper of the disc brake by way of a bearing disc. An axial bearing is formed axially on one side of a drive ring and a ball ramp clutch with freewheel function is formed axially on the opposite side of the drive ring. The ball ramp clutch has balls, a drive bush arranged at the drive input side axially between the axial bearing and the balls thereof and a drive-output-side clutch ring. A cone clutch is arranged between the drive-output-side clutch ring and a spring sleeve for a cylindrical spring. The drive-output-side clutch ring is designed for a working angle of rotation as limited by at least one stationary stop.

The working angle of rotation is to be understood to mean the angle of rotation by which the adjusting device is rotated in the event of an automatic adjustment process during a braking process.

As a result, it is achieved that, during a turning-back operation, the blocking action of the freewheel is eliminated for this operating situation by virtue of the drive-output-side clutch ring being prevented from rotating, which is possible by way of a stationary stop. At the same time, a limited working angle of rotation is provided which permits the automatic adjustment in the opposite direction of rotation of the drive-output-side clutch ring.

This design offers the following advantages:

(1) relatively low force expenditure during a manual turning-back operation, because no load shift clutch need be overcome;

(2) no additional components required for the restoring mechanism; and (3) cost-effective production by way of non-cutting shaping technology.

A directional clutch which acts in the axial direction is installed in this adjusting device. The directional clutch is formed from a ball ramp system and a friction clutch, in particular a ball-cone clutch.

When turning back by hand, the rotational movement is introduced via the shaft and the spring sleeve initially into the ball-cone clutch. From there, the movement is transmitted into the ball ramp clutch by way of the frictional engagement in the ball-cone clutch. Since the ball-cone clutch and ball ramp clutch are designed for self-locking, the clamping action takes effect. Turning back is therefore not directly possible. To permit turning back, it is necessary for the clamping action of the directional clutch to be eliminated.

If the drive-output-side clutch ring is prevented from rotating, the clamping action of the freewheel system can be suppressed. The bore of the clutch ring therefore has a profiling, by which the ring is prevented from turning back in the so-called rest position of the adjuster. The clutch ring is supported on a stop, preferably on a stop of the rotationally fixedly mounted collar bush, which has an external profiling matching the internal profiling of the clutch ring. The two profilings are coordinated with one another such that the clutch ring has the clearance necessary for the working angle of rotation for the automatic air play adjustment.

In order that the clamping action of the freewheel is not present in the rest position, it is highly important that the collar bush and the clutch disc which is coupled by way of the profiling are positioned correctly.

In a preferred embodiment, the stop is integrally formed on an end section of a collar bush which extends axially through the ball ramp clutch and through the drive-output-side clutch ring, the other end of which collar bush has a collar which forms a stationary section of the axial bearing. In this way, a component is provided which has multiple functions and which reduces the number of different parts and facilitates assembly.

It is also preferable for the other end of the collar bush, which end forms the stationary section of the axial bearing, to be fastened in a rotationally fixed manner to the bearing disc which is attached to the brake caliper.

The cone clutch is preferably a ball-cone clutch which has the drive-output-side clutch ring and a tapered bush which is connected to the spring sleeve. Clamping balls are arranged between the drive-output-side clutch ring and the tapered bush.

The axial bearing is formed by one side of the drive ring, by rolling bodies and by a collar of a collar bush which extends axially through the ball ramp clutch. This likewise reduces the number of different parts and provides a compact design.

A disc brake, in particular pneumatically actuated disc brake, has an adjusting device according to the above description.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a partial section illustration of an exemplary embodiment of an adjusting device according to the invention;

FIG. 2 is an enlarged partial section illustration of the upper region of FIG. 1;

DETAILED DESCRIPTION OF THE DRAWINGS

Figure 3:
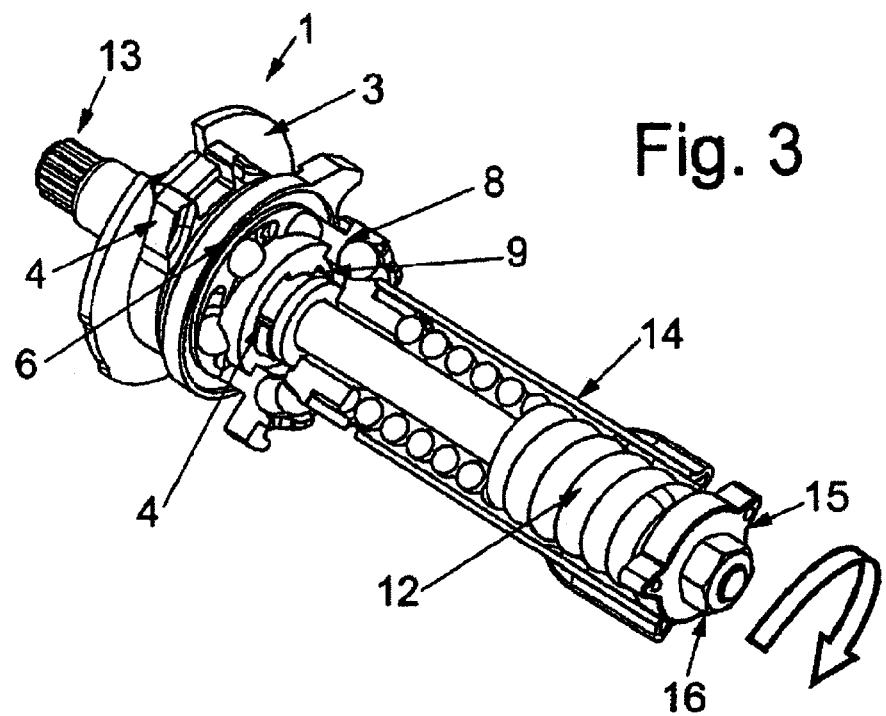
FIG. 3 is a perspective partial section view of the exemplary embodiment according to FIG. 1.

Elements with the same or similar functions are provided with the same reference numerals in the figures.

Figure 6:
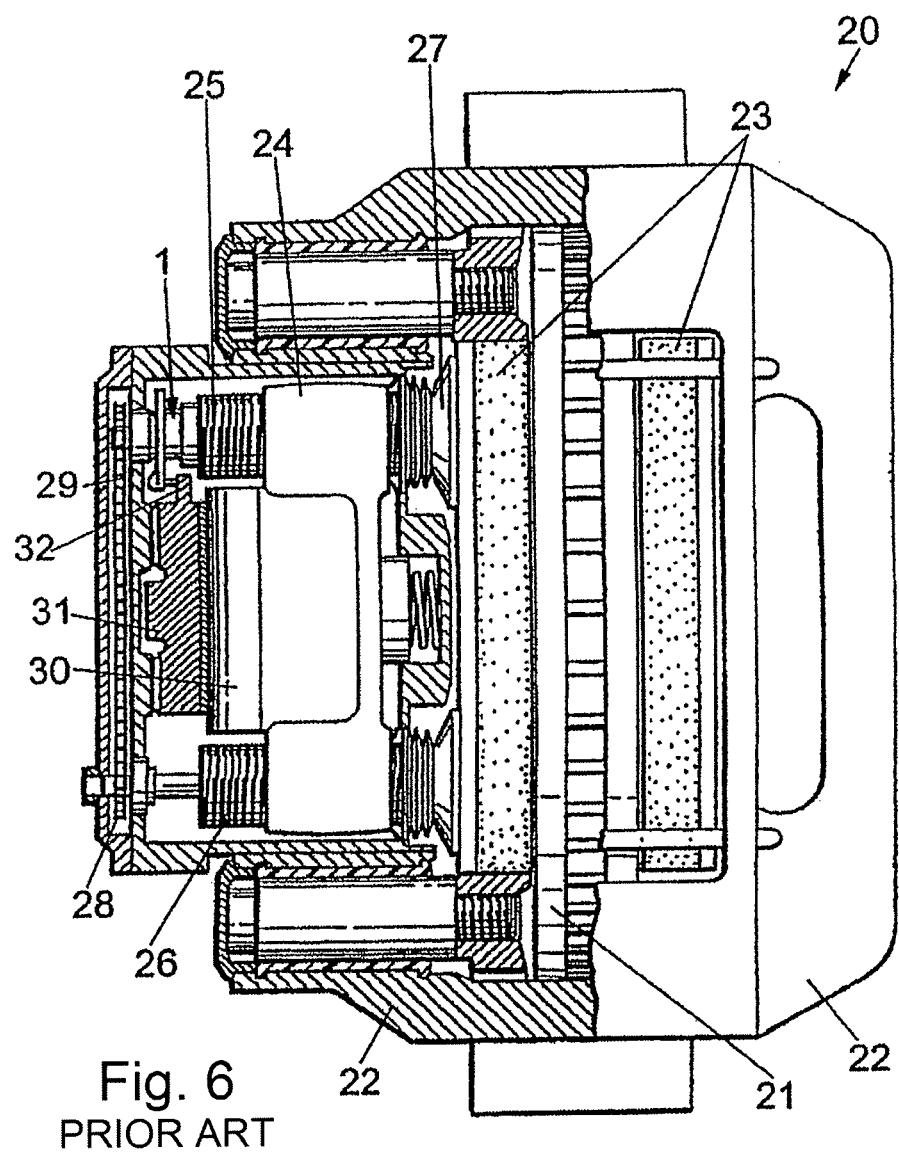
FIG. 6 is a schematic illustration of a disc brake.

With regard to the design and function of a pneumatic disc brake according to FIG. 6, reference is made to the corresponding description of DE 197 29 024 C1, the specification of which is expressly incorporated by reference herein. The following components are indicated in FIG. 6: disc brake 20, brake disc 21, brake caliper 22, brake pads 23, bridge 24, adjusting spindles 25 and 26, thrust pieces 27, sprockets 28, chain 29, eccentric 30 and rotary lever 31, which has a drive element 32 interacting with a shift fork of an adjusting device 1. The adjusting device 1 is in this case arranged in the adjusting spindle 25. An adjusting device 1 will now be explained in more detail. The adjusting device 1 would also be suitable for an electromotively actuated disc brake.

In this regard, reference is made to FIGS. 1, 2 and 3. FIG. 1 is a partial section illustration of an exemplary embodiment of an adjusting device 1 according to the invention. FIG. 2 illustrates an enlarged partial section illustration of the upper region of FIG. 1, and FIG. 3 shows a perspective partial section illustration of the exemplary embodiment according to FIG. 1.

The adjusting device 1 has the following: a shaft 2, having a drive journal at its upper end; a bearing disc 3 for fastening the adjusting device 1 in the brake caliper 22 (see FIG. 6); a collar bush 4 which is rotationally fixedly coupled to the bearing disc 3 and has an upper collar with a running surface arranged therebelow for balls of an axial bearing 5; a drive ring 6 which is connected to a shift fork which is coupled to the drive element 32 (see FIG. 6) of the rotary lever 31; a ball ramp clutch 7 having a clutch ring 8 which interacts with a tapered bush 11 which is connected to a spring sleeve 14 for conjoint rotation therewith; a cylindrical spring 12 which is arranged in the spring sleeve 14 and which is supported on a profiled disc 15; and an adjusting element 16, for example a nut, which is arranged on the lower end of the shaft 2 and serves for stressing the cylindrical spring 12 and holding the elements of the adjusting device 1 together axially.

The ball ramp clutch 7 is composed of a drive bush 33, which is a lower section of the drive ring 6, balls or rolling bodies, and the clutch ring 8, with the clutch ring 8 having an upper section for receiving the balls and a lower section which forms a part of the cone clutch 17. The general function of the adjusting device 1 is described in detail in DE 10 2004 037 771 A1 with regard to FIG. 5, to which reference is hereby made.

Figure 5:
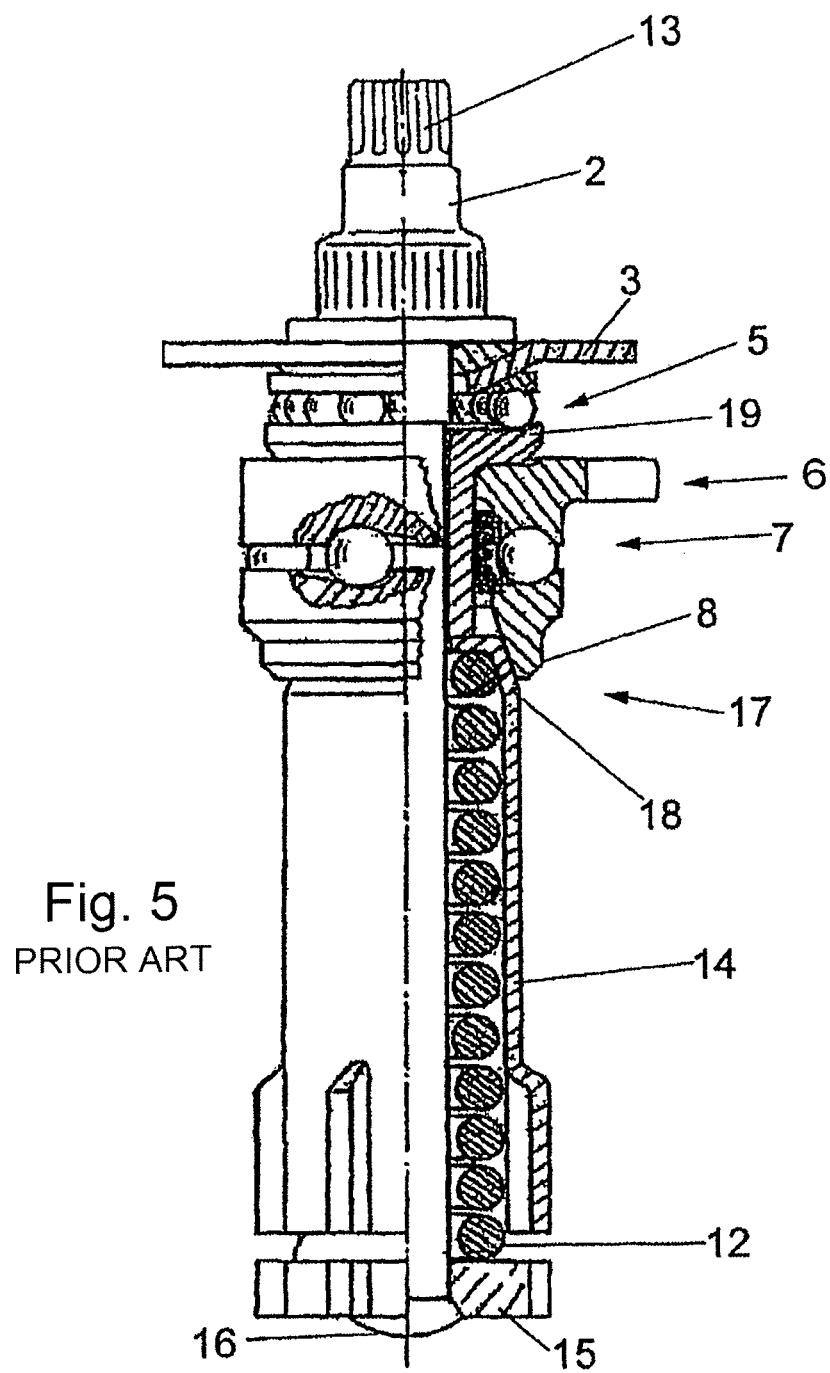
FIG. 5 is a partial section illustration of an adjusting device according to the prior art.

As a first difference in relation to the adjusting device according to FIG. 5, in the exemplary adjusting device 1 according to the present invention, the axial bearing 5 is formed from the collar of the collar bush 4, from one side of the drive ring 6 and from rolling bodies. The lower end of the collar bush 4 which extends through the ball ramp clutch 7 forms, directly or via a thrust washer, an axial stop 9 for the tapered bush 11. The tapered bush 11 is pressed upward by the cylindrical spring 12 via the spring sleeve 14, with the cone clutch 17, ball ramp clutch 7 and axial bearing 5 components being held together and pressed together axially.

The collar bush 4 with its stop serves to maintain a minimum play of the bearing arrangements.

A significant difference in relation to the prior art consists in that the drive-output-side clutch ring 8 has only a limited angle of rotation, specifically a limited working angle of rotation $\alpha_A$, which will be explained in more detail in FIG. 4.

A restoring process of the adjusting device 1 will now be explained on the basis of FIGS. 1-3.

The shaft 2 has, at its left-hand end in FIG. 3, a drive journal 13 which has a corresponding key, for example a hexagonal profiling. With a tool engaged thereon, for example an offset box wrench, the shaft 2 is now turned clockwise in the direction of the arrow shown. Here, the rotational movement is introduced via the shaft 2 and the spring sleeve 14 into the cone clutch 17. That is to say, via the tapered bush 11 into the clamping balls 10, and from the latter into the drive-output-side clutch ring 8. In its rest position, that is to say in the position in which no automatic adjustment takes place, the drive-output-side clutch ring 8 bears against a stationary stop 9 (FIG. 4) and can co-rotate no further. In this respect, the clutch ring 8 which is prevented from rotating cannot transmit any rotation to the ball ramp clutch 7, which is therefore also not adjusted into a transmission position. In this way, the torque introduced by the box wrench into the shaft 2 can rotate the spring sleeve 14 further, and the rotational movement can be transmitted to the adjusting spindle 25 (not shown) for a restoring movement.

Figure 4:
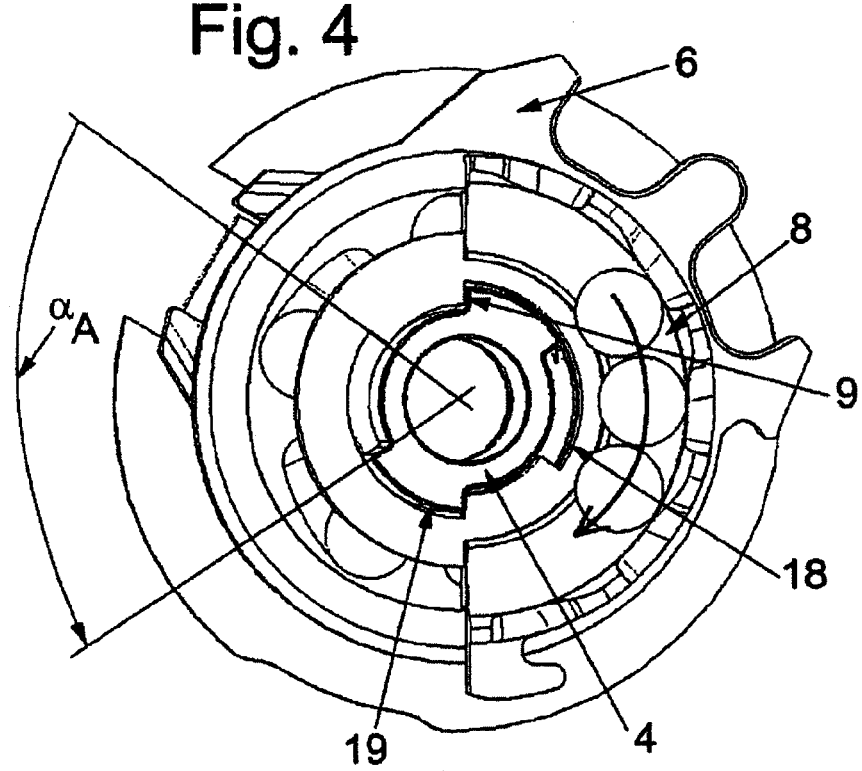
FIG. 4 is an enlarged perspective partial section view taken along X-X in the region of a clutch ring according to FIG. 2.

The region of the stop 9 is shown in FIG. 4 in an enlarged partial section view (line X-X in FIG. 2 in the region of the clutch ring 8). The collar bush 4 has an elongated lower end (FIG. 2) which extends axially through the ball ramp clutch 7 into the clutch ring 8 and which, in the region, is provided with an external profile 36. The external profile 36 extends radially outward and is designed for example in the form of a sector of a circle. The external profiling 36 is arranged symmetrically and interacts with a corresponding internal profiling 35 of the surrounding clutch ring 8. Here, intermediate spaces are arranged on the circular circumference of the internal profile 35 and external profile 36, which intermediate spaces define the working angle of rotation $\alpha_A$. The clutch ring 8 can therefore rotate by the working angle $\alpha_A$, which is defined by the profiling 35 and 36, during an automatic adjustment. During a restoration in the opposite direction, however, the external profile 36 of the collar bush 4 forms the stop 9, which prevents a rotational movement of the clutch ring 8 driven by a restoring wrench.

In this example, the locking of the collar bush 4 is provided by way of the bearing disc 3 fastened to the brake caliper 22, by virtue of bent lugs of the bearing disc 3 engaging into radial recesses on the circumference of the collar of the collar bush 4.

The invention is not restricted to the exemplary embodiments described above, and can be modified within the scope of the appended claims. For example, the locking of the collar bush 4 may take place directly on the brake caliper 22, for example by way of cams and corresponding recesses in the brake caliper 22. The internal and external profiles 35, 36 may also have other shapes.

| Table of Reference Symbols | |
|---|---|
| 1 | Adjusting device |
| 2 | Shaft |
| 3 | Bearing disc |
| 4 | Collar bush |
| 5 | Axial bearing |
| 6 | Drive ring |
| 7 | Ball ramp clutch |
| 8 | Clutch ring |
| 9 | Stop |
| 10 | Clamping balls |
| 11 | Tapered bush |
| 12 | Cylindrical spring |
| 13 | Drive journal |
| 14 | Spring sleeve |
| 15 | Profiled disc |
| 16 | Adjusting element |
| 17 | Cone clutch |
| 18 | Sleeve cone |
| 19 | Spacer sleeve |
| 20 | Disc brake |
| 21 | Brake disc |
| 22 | Brake caliper |
| 23 | Brake pads |
| 24 | Cross-member (bridge) |
| 25 | First adjusting spindle |
| 26 | Second adjusting spindle |
| 27 | Thrust piece |
| 28 | Sprockets |
| 29 | Chain |
| 30 | Eccentric |
| 31 | Rotary lever |
| 32 | Drive element |
| 33 | Drive bush |
| 35 | Internal profile |
| 36 | External profile |
| $\alpha_A$ | Working angle of rotation |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wear adjustor for a pneumatic disc brake having a rotary-lever actuated brake application device with an adjusting spindle into which the wear adjustor is insertable, the wear adjustor comprising:
a bearing disc by which the wear adjustor is attachable to a caliper of the disc brake;
a drive ring on a drive-output side of the bearing disc;
an axial bearing, wherein the axial bearing includes a drive-input side formed by a drive-output side portion of one of the bearing disc or a bearing surface rotationally fixed relative to the bearing disc, a drive-output side of the axial bearing formed by a drive-input side of the drive ring, and axial bearing balls located between the bearing disc and the drive ring;
a ball ramp clutch having a freewheel function, wherein the ball ramp clutch includes a drive-input side formed by a drive-output side of the drive ring, a drive-output side formed by a drive-input side of a clutch ring, and ball ramp clutch balls located between the drive ring and the clutch ring; and
a cone clutch, wherein the cone clutch includes a drive-input side formed by a drive-output side of the clutch ring, a drive-output side formed by a spring sleeve for a cylindrical spring having a tapered cone portion at a drive-input end of the spring sleeve, and cone clutch balls located between the clutch ring and the tapered cone portion of the spring sleeve, wherein the clutch ring is operatively configured for a working angle of rotation limited by at least one stationary stop, the at least one stationary stop is integrally formed on a first end section of a collar bush at a drive-output end of the collar bush extending axially through the ball ramp clutch and the clutch ring, and the drive-input side of the axial bearing is the bearing surface rotationally fixed relative to the bearing disc, and the bearing surface rotationally fixed relative to the bearing disc is formed by a second end section of the collar bush at a drive-input end of the collar bush axially opposite the first end section.

2. The wear adjustor according to claim 1, wherein the at least one stationary stop is operatively configured as an external profile for engagement into and interacting with an internal profile of the drive-output side clutch ring.

3. The wear adjustor according to claim 2, wherein the internal profile and the external profile are operatively configured to delimit the limited working angle of rotation of the drive-output side clutch ring.

4. A pneumatic disc brake, comprising:
a caliper;
a rotary lever-actuated brake application device arranged in the caliper, the brake application device comprising an adjusting spindle;
a wear adjustor operatively configured to adjust the adjusting spindle to account for wear of brake pads and a brake disc of the disc brake;
wherein the wear adjustor is attached to the caliper by a bearing disc;
the wear adjustor comprising:
an axial bearing, wherein the axial bearing includes a drive-output side portion of one of the bearing disc or a bearing surface rotationally fixed relative to the bearing disc as a drive-input side of the axial bearing, a drive-input side of the drive ring as a drive-output side of the axial bearing and axial bearing balls located between the bearing disc and the drive ring;
a ball ramp clutch having a freewheel function, wherein the ball ramp clutch includes a drive-output side of the drive ring as a drive-input side of the ball ramp clutch, a drive-input side of a clutch ring as the drive-output side of the ball ramp clutch and ball ramp clutch balls located between the drive ring and the clutch ring; and;
a cone clutch, wherein the cone clutch includes a drive-output side of the clutch ring as a drive-input side of the cone clutch, a spring sleeve for a cylindrical spring having a tapered cone portion at a drive-input end of the spring sleeve as a drive-output side of the cone clutch and cone clutch balls located between the clutch ring and the tapered cone portion of the spring sleeve,
wherein the clutch ring is operatively configured for a working angle of rotation limited by at least one stationary stop,
the at least one stationary stop is integrally formed on a first end section of a collar bush at a drive-output end of the collar bush extending axially through the ball ramp clutch and the clutch ring, and
the drive-input side of the axial bearing is the bearing surface rotationally fixed relative to the bearing disc, and the bearing surface rotationally fixed relative to the bearing disc is formed by a second end section of the collar bush at a drive-input end of the collar bush axially opposite the first end section.

5. The pneumatic disc brake according to claim 4, wherein the at least one stationary stop is operatively configured as an external profile for engagement into and interacting with an internal profile of the drive-output side clutch ring.

6. The pneumatic disc brake according to claim 5, wherein the internal profile and the external profile are operatively configured to delimit the limited working angle of rotation of the drive-output side clutch ring.

* * * * *